Jan. 5, 1954     T. F. KUHN     2,664,767
AUTOMATIC POWER TRANSMISSION
Filed Aug. 21, 1950     3 Sheets-Sheet 1

INVENTOR.
Theodore F. Kuhn
BY
ATTORNEY.

Jan. 5, 1954  T. F. KUHN  2,664,767
AUTOMATIC POWER TRANSMISSION
Filed Aug. 21, 1950  3 Sheets-Sheet 2

INVENTOR.
Theodore F. Kuhn
BY
ATTORNEY.

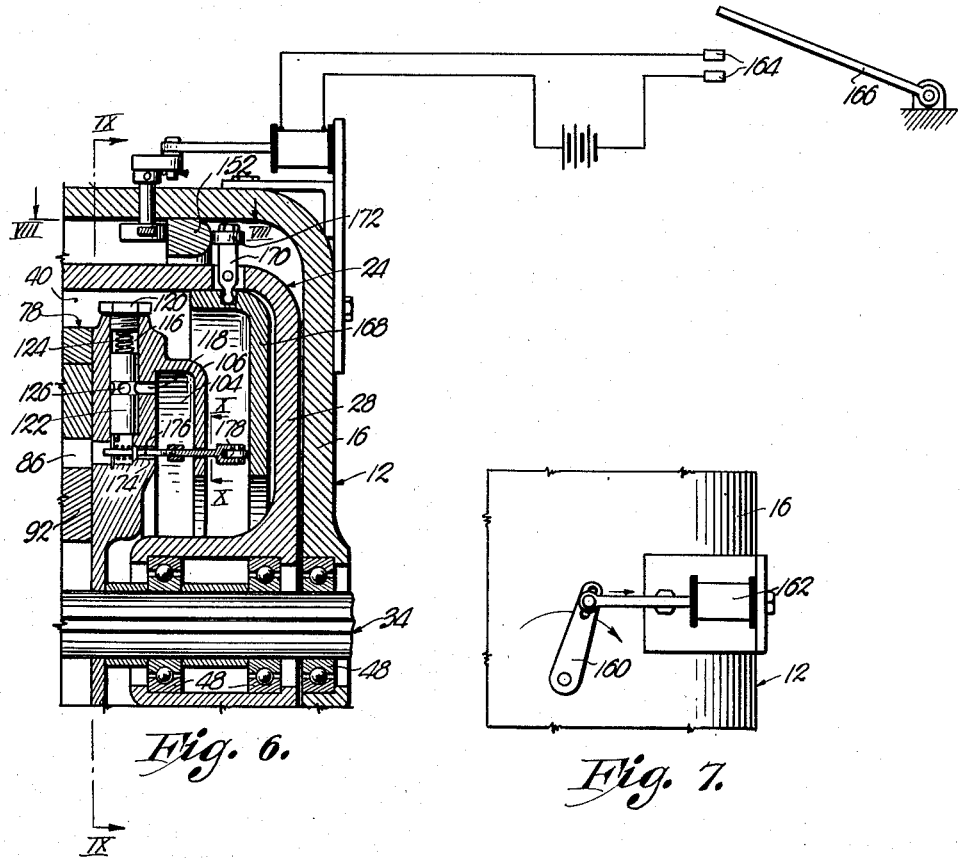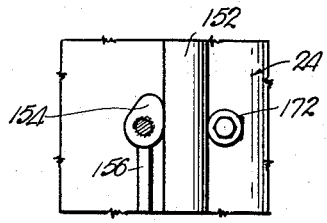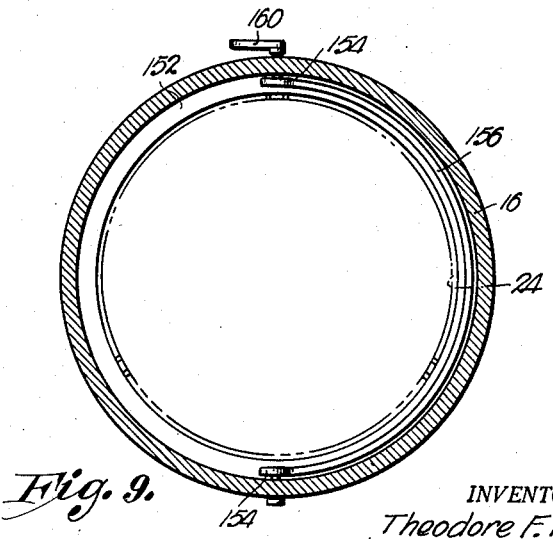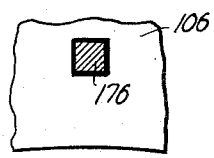

Patented Jan. 5, 1954

2,664,767

UNITED STATES PATENT OFFICE 2,664,767

AUTOMATIC POWER TRANSMISSION

Theodore F. Kuhn, Kansas City, Kans.

Application August 21, 1950, Serial No. 180,578

6 Claims. (Cl. 74—752)

This invention relates to the field of power transmission, i. e., to structure interposed between a driving member and a driven member for transmitting power from the prime mover of the driving member to any device or apparatus operably coupled with the driven member, the primary object being to provide a power transmission for automatically changing the ratio or relative speeds of rotation of the driving and driven members from any pre-selected ratio to a direct drive.

It is the most important object of the present invention to provide a non-slipping, constant mesh, infinitely variable speed ratio power transmitting device wherein the ratio is changed from a predetermined ratio to a direct drive and vice versa, all automatically and absolutely without power interruption or the need of manually operable parts or operator attention of any nature whatsoever.

Another equally important object of this invention is the provision of a transmitting device wherein the speed ratio between the drive shaft and the driven shaft is automatically and infinitely varied in direct response to the speed of rotation of the driven shaft.

A further important object of this invention is the provision of a power transmitting apparatus wherein centrifugal forces induced by the rotation of the driven shaft and the variances in such forces are utilized to automatically and accurately change the relative speeds of rotation between the drive shaft and the driven shaft in direct response and proportion to changes in loads on the driven shaft.

An object of this invention is the provision of a power transmission as above set forth that is capable of being manufactured in any desired manner to suit the demands of prime mover design, power needs, variable load conditions, and other factors peculiar to the particular adaptation that is desired to be made of the transmission.

An additional object of this invention is the provision of power transmitting means that is universally adaptable for virtually any use between prime movers of all kinds and whatever load may be desired to be placed on the driven shaft whether in the field of internal combustion engines, electric motors or other power means in the field of mobile vehicles or appliances, or in other commercial adaptations such as between a prime mover and movable apparatus requiring power means for operation thereof.

A still further object of this invention is to provide a power transmission having gear reduction between the drive shaft and the driven shaft that may be selected to suit the desires and needs of the manufacturer, and having structure operable in connection therewith for inter-connecting the drive shaft and the driven shaft separate from the reduction gearing and designed to automatically be placed in operation in lieu of the reduction gearing immediately upon the driven shaft reaching a predetermined speed of rotation and to continue in its function of operably joining the shafts until the speeds of rotation of the shafts are the same, i. e., until a direct drive exists between the shafts.

Other more minor objects of this invention include the provision of a power transmission of the infinitely varying speed ratio-type as above set forth and having auxiliary power transmitting means forming a part thereof and usable selectively as desired in predetermined speed ratios both forwardly and in reverse; the provision of manually operable structure permitting control of the variable speed transmission to change the ratio between the shafts as desired; and to provide an over-all assembly that is inexpensive to manufacture, highly positive in its operation, long-lasting, of excellent performance and easily maintained in operating order without the need of particular, highly trained mechanical skill.

Many more objects of this invention, including details of construction, will be made clear or become apparent as the following specification progresses, reference being had to the accompanying drawings, wherein:

Fig. 6 is a fragmentary, cross-sectional view similar to Fig. 1, illustrating a slightly modified form of the present invention.

Fig. 7 is a fragmentary, top plan view thereof.

Fig. 8 is a fragmentary, detailed, cross-sectional view taken on line VIII—VIII of Fig. 6.

Fig. 9 is a cross-sectional view taken on line IX—IX of Fig. 6 looking in the direction of the arrows; and Fig. 10 is a fragmentary, detailed, cross-sectional view taken on line X—X of Fig. 6.

Figures 1, 4:
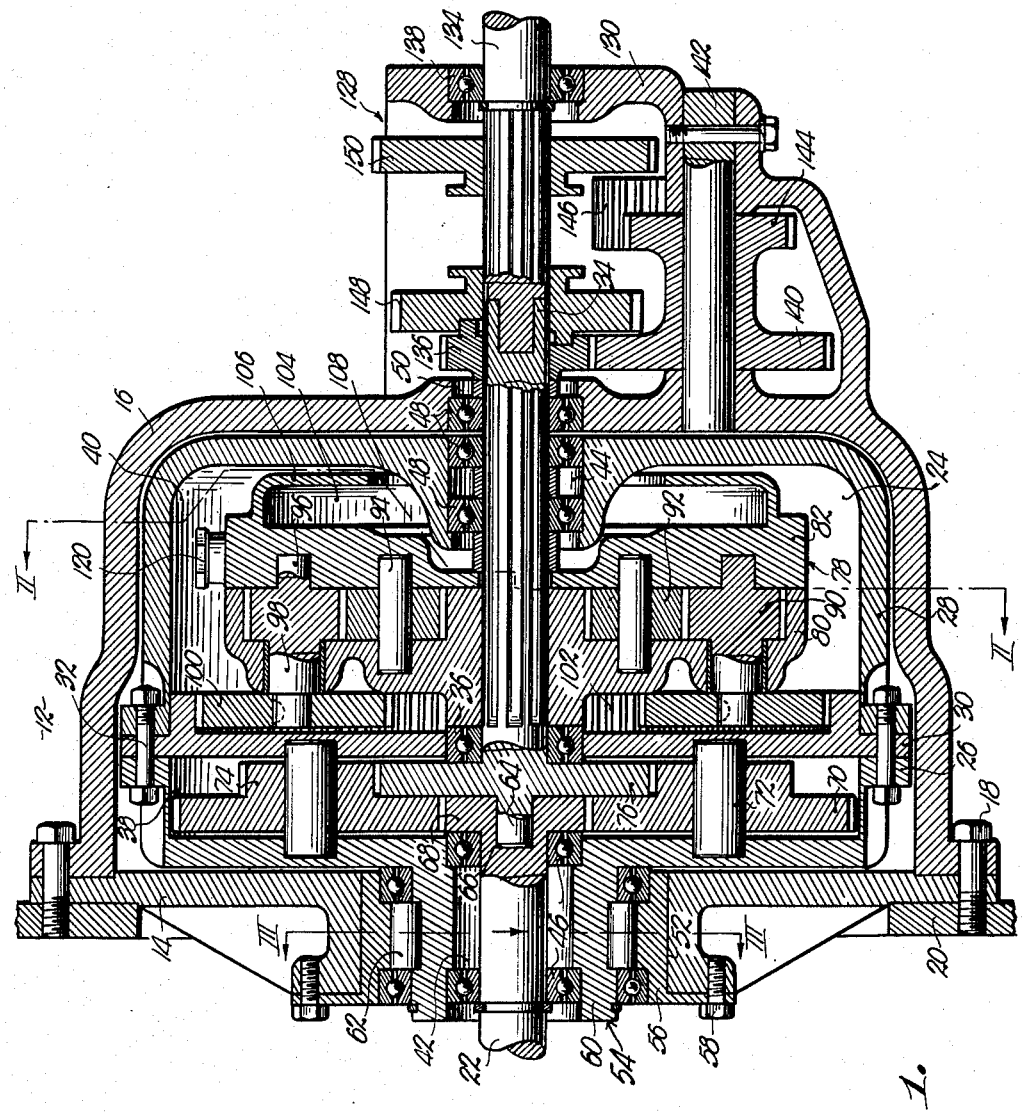
Figure 1 is a cross-sectional view of an infinitely variable speed ratio automatic power transmission made according to the present invention and taken on irregular line I—I of Fig. 2.
Fig. 4 is a fragmentary, detailed, cross-sectional view taken on line IV—IV of Fig. 2 looking in the direction of the arrows.

In the form of my invention illustrated in Figs. 1 to 5 inclusive, there is provided a hollow housing broadly designated by the numeral 12 comprised of a pair of sections 14 and 16, releasably interconnected through the medium of fastening elements 18 which may also, if desired, be used to mount the entire housing 12 on a support 20 that in turn may comprise a part of a prime mover for a driving shaft 22.

A hollow case broadly designated by the numeral 24, disposed within the housing 12, is comprised of a pair of outermost sections 26 and 28 and an intermediate section 30, all releasably interconnected through the medium of bolts or the like 32. The intermediate section 30 cooperating with a driven shaft 34 and with a bearing 36 for shaft 34, centrally mounted within section 30, presents a continuous partition for the case 24 dividing the latter into a gear compartment 38 and a pump compartment 40.

The sections 26 and 28 of the case 24 are each provided with an elongated bore 42 and 44 respectively coaxially aligned with the bearing 36. The bore 42 mounts a number of bearings 46 for the drive shaft 22 and similarly, the driven shaft 34 is provided with a number of bearings 48, both in the bore 44 of case section 28 and in an opening 50 formed in housing section 16 in direct alignment with bore 44. Consequently, the shafts 22 and 34 are in direct coaxial alignment by bearings 36, 46 and 48. The housing section 14 is likewise provided with an opening 52 concentric with shaft 22, through which projects that part of case section 26 having bore 42 formed therein.

A one way brake broadly designated by the numeral 54, and including an annulus 56, is mounted within the opening 52 of housing section 14, the annulus 56 being releasably secured to section 14 by means of fastening elements 58. Brake 54 is of substantially conventional character and includes a cam member 60 circumscribing bore 42 and formed integrally in that portion of section 14 having bore 42 therein, together with a plurality of rollers 62 interposed between cam member 60 and the annulus 56.

Figure 3:
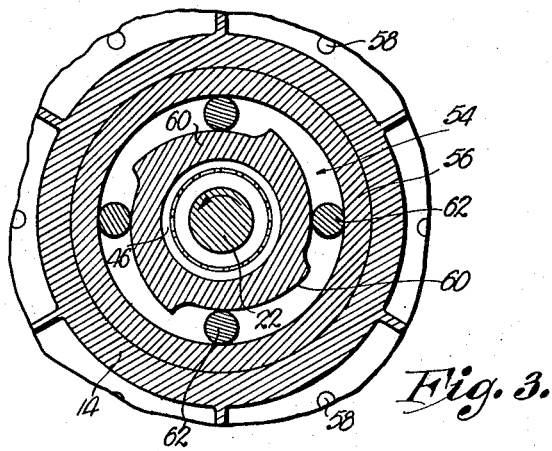
Fig. 3 is a cross-sectional view taken on line III—III of Fig. 1, looking in the direction of the arrows.

As shown in Fig. 3 of the drawings, the brake 54 is so formed and arranged to permit rotation of case 24 in the same direction as that of drive shaft 22, as indicated by the arrow in Fig. 1, but to prevent rotation of the case 24 in the direction opposite to the normal direction of rotation of shaft 22 as indicated by said arrow.

That end of the shaft 34 proximal to shaft 22 is provided with a concentric, outwardly extending pin 64 projecting into a complemental cavity 66 formed in the shaft 22 for free rotation therein.

A sun gear 68 formed on the innermost end of shaft 22 circumscribes pin 64 and is constantly in mesh with a plurality of planet gears 70, there being three of such gears 70 in the present illustrated embodiment of this invention.

A spindle 72 is provided for each gear 70 respectively, said spindles 72 being in parallelism with the shafts 22 and 34 and arranged in a circular path concentric with said last-mentioned shafts. All three spindles 72 span the distance between and are mounted within the proximal spaced-apart, parallel faces of case sections 26 and 30.

A second planet gear 74 is provided for each gear 70 respectively preferably integral therewith as illustrated between gears 70 and case section 30. It is noted that the spindles 72 serve as a common axis of rotation for gears 70 and 74 and that in the instance illustrated, the diameters of the gears 74 are less than that of the gears 70. The planet gears 74 are all in mesh with a sun gear 76 on that end of shaft 34 proximal to shaft 22 and having a diameter that is greater than sun gear 68. Accordingly, all of the gears 68, 70, 74 and 76 are mounted within the compartment 38 of hollow case 24.

A hollow body broadly designated by the numeral 78, is composed of a pair of sections 80 and 82, releasably interconnected through the medium of a plurality of fastening elements 84. Body 78 is mounted in its entirety within the compartment 40 of case 24 in concentric circumscribing relationship to shaft 34 and is rigidly splined to the latter for rotation therewith.

Figure 2:
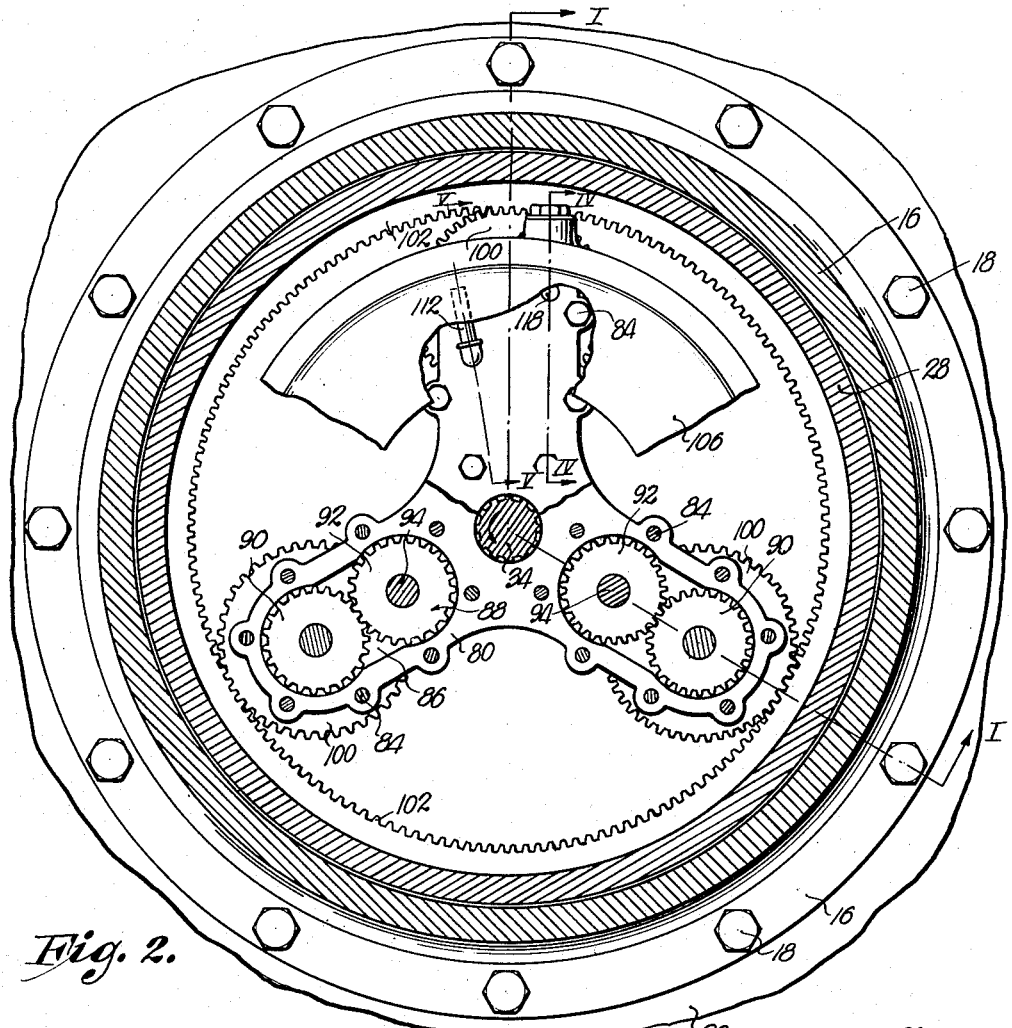
Fig. 2 is a cross-sectional view taken on irregular line II—II of Fig. 1.

A plurality of hollow pump housings 86 is formed in the section 80 of body 78, there being three of such housings 86 as illustrated in Fig. 2 of the drawings and each carrying a gear pump broadly designated by the numeral 88. Pumps 88 are of conventional character in that the same comprise a pair of intermeshing gears 90 and 92. The gears 92 proximal to the driven shaft 34 are mounted on stub shafts 94 traversing the respective housing 86 and mounted in sections 80 and 82 of body 78. The gears 90 of the pumps 88 on the other hand, are provided with a pair of opposed preferably integral spindles or pintles 96 and 98, the pintles 96 being rotatably carried by the body section 82 and the spindles 98 projecting outwardly beyond the body section 80 toward the intermediate case section 30.

It is seen therefore, that all of the pintles or spindles 96 and 98, as well as all of the stub shafts 94, are mounted for rotation and have their corresponding gears 90 and 92 on axes parallel with the axis of rotation of shaft 34. Also, the pintles 96 and 98 are within a circular path concentrically circumscribing shaft 34 and the stub shafts 94 are within a similar path of lesser diameter. Each spindle 98 respectively, rigidly carries a planet gear 100, all three of which are in mesh with an internal ring gear 102 formed in that face of intermediate case section 30 proximal to compartment 40 and concentrically circumscribing the shaft 34. The section 82 of body 78 has a chamber 104 formed therein, a wall 106 integral with section 82 and forming the chamber 104 having an opening 108 circumscribing the shaft 34 and placing the chamber 104 in communication with the compartment 40.

Figure 5:
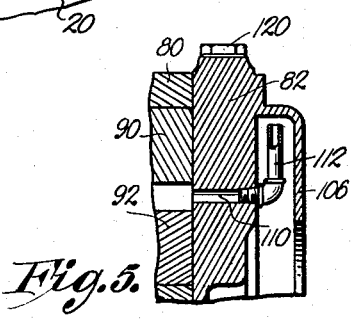
Fig. 5 is a cross-sectional view similar to Fig. 4 taken on line V—V of Fig. 2.

A fluid inlet passageway 110 is formed in body section 82 in register with each pump housing 86 respectively that communicates with the chamber 104 through the medium of an L-shaped pipe 112, each having the inlet end thereof facing the innermost peripheral face of chamber 104 in the manner illustrated by Fig. 5 of the drawings. In other words, the short leg of each pipe 112 is joined with the body section 82, whereas the longitudinal axes of the L-shaped pipes 112 are radial with respect to the shaft.

A fluid outlet passage 114, is formed in the body section 82 in opposed relationship to each fluid inlet passageway 110 respectively and communicates directly with the corresponding pump housing 86. The body section 82 is also provided with a radial bore 116 registering with each fluid outlet passage 114 respectively at the innermost end of the bore 116 and a hole 118 places each bore 116 intermediate the ends of the latter in direct communication with the chamber 104. The outermost end of each bore 116 is closed by a removable plug 120 and a reciprocable tubular valve 122 is mounted in each bore 116 respectively. The length of each valve 122 is less than the length of the corresponding bore 116 and valves 122 are each held biased at the innermost end of their paths of travel by a spring 124 interposed between plug 120 and valve 122.

Valves 122 are each provided intermediate the ends thereof with an external groove 125 always in register with the hole 118 when the valves 122 are at the innermost ends of their paths of travel. One or more perforations 126 in valves 122 place the interior thereof in register with groove 125.

It is significant at this point to note that the body 82 in its entirety is joined directly to shaft 34 as above set forth for rotation therewith, but, except for the interconnection between planet gears 100 and ring gear 102, there is no joinder between body 78 and case 24 which houses the former in compartment 40.

The operation of the transmission as thus far described, is as follows:

The sun gear 68 rotates at the speed of the driving shaft 22, which may or may not be the same speed of rotation as that of the prime mover for driving shaft 22, depending upon the nature of the connection between shaft 22 and its prime mover. Sun gear 68 transmits rotative motion to all of the plant gears 70 in the direction opposite to that of sun gear 68 and shaft 22, which motion is transmitted via planet gears 74 to sun gear 76 on driven shaft 34 to rotate the latter in the same direction as shaft 22.

Such indirect drive of the prime mover, transmitted to a device connected with driven shaft 34, is caused by the brake 54 holding the case 24 against rotation opposite to that of shaft 22. Except for the brake 54, planet gears 70, rotating opposite to shaft 22, would not overcome a load on shaft 34 and would instead, rotate case 24.

Thus, while spindles 72 and case 24 remain stationary, body 78 will rotate in the same direction as shafts 22 and 34 and at the same speed as the latter. Stationary ring gear 102, serving as a fulcrum for planet gears 100, will cause the latter to rotate thereabout as spindles 98 travel through a circular path having shaft 34 as its axis, with planet gears 100 rotating oppositely to that of shafts 22 and 34.

Under these conditions, all of the valves 122 are open as illustrated in Fig. 4 and a suitable fluid such as a lubricant contained within the housing 12, passes freely to and from chamber 104 under influence of the pumps 88 driven by planet gears 100 through spindles 98.

Normally, housing 12 is not completely filled with the lubricant so that the level thereof is below the shaft bearings when the transmission is at rest, thereby preventing tendencies to leakage. Thus, except for chamber 104, the pumps 88 would be starved during operation. Also, disposition of the inlet ends of pipes 112 near the periphery of chamber 104 assures availability of fluid to the pumps 88 at all times since the chamber 104 is kept filled with fluid by centrifugal force.

Manifestly, the differences in speed of rotation between shafts 22 and 34, depend on engine design and gears 68, 70, 74 and 76 and may be chosen as desired to obtain a pre-selected ratio. Such selection of the ratio will depend upon the applications to be made and will differ for instance between passenger automobiles and trucks, between tractors and cranes, and between an electric prime mover and an internal combustion engine for driving shaft 22.

It is clear that whenever shaft 34 is directly coupled with a load, the prime mover for shaft 22 is taxed tremendously at the time commencement of rotation of shaft 34 takes place, although the prime mover may be fully capable of continuing the driving of shaft 34 with no difficulty once the full desired speed of rotation of shaft 34 is attained.

Thus, whenever such starting load is tremendously great as compared with the normal operating load, the preselected ratio should be great, thereby eliminating the necessity of expensive prime movers having reserve power that become surplus and unnecessary, once the initial starting resistance is overcome.

Similarly, whenever there is extreme variance in the load, such as for instance in trucks and tractors, the ratio should be increased whereby the maximum power of the prime mover may be utilized if such should become necessary.

The tendency of case 24 to rotate in the direction opposite to that of shafts 22 and 34 before a direct drive is attained, is caused by the following action. First, the power transmitted by gear 68 to gears 70 tends to rotate the case 24 in the direction of shaft 22. However, because of the reduction in ratio provided for by gears 74 in mesh with gear 76, such tendency is reversed in case 24. But, as above mentioned, brake 54 or analogous means, will not permit such rotation of case 24 opposite to shafts 22 and 34 and will permit rotation of case 24 in the same direction as shafts 22 and 34.

Obviously, resistance of case 24 to rotation in the direction of rotation of shafts 22 and 34, is influenced by the bias of rotating planet gears 70, tending to rotate case 24 in the direction opposite to that of shafts 22 and 34, and such resistance must be overcome by the resistance to passage of fluid through valves 122 before any change in gear ratio between shafts 22 and 34 takes place.

As the speed of the shaft 22, and accordingly, the speeds of rotation of shaft 34 and body 78 increase, the tension of springs 124 is gradually and progressively overcome as centrifugal force moves the tubular valves 122 outwardly toward case 24. Whether or not case 24 commences to rotate before or after valves 122 start to close will depend upon engine design and the desires of the manufacturer. In any event, case 24 will commence rotating from a standstill position in the same direction as that of shafts 22 and 34, and as the speed of the latter continues to increase, case 24 will rotate slowly at first and thereupon gradually and progressively faster as the resistance to flow of fluid through valves 122 becomes gradually and progressively greater.

In other words, such progressively increased resistance to fluid flow, directly effects the pumps 88 gradually and progressively reducing the speed of rotation of spindles 98 and planet gears 100. The speed of rotation of ring gear 102 and case 24 increases in direct proportion to the decrease in speed of rotation of gears 100.

As soon as the speed of rotation of body 78 is great enough to close valves 122 entirely, pumps 88 become inoperative, spindles 98 and gears 100 cease rotation on their respective axes, and the body 78, gears 100, gear 102 and case 24 become interlocked for rotation as a unit with shaft 34. When such condition exists, a direct drive is obtained, i. e., the shaft 34 is rotated by shaft 22 at the same speed as the latter.

It is notable further, that throughout the time that such direct drive exists, the gears 70 and 74, cease rotating on spindles 72 and all of the gears in compartment 38, together with all of the spindles 72 therewithin, rotate as a unit.

with the gears 68 and 76 with the shafts 22 and 34, with case 24 and with body 78.

If now a greater load is applied to the driven member 34, an increase in power in the prime mover for shaft 22 to compensate for the load, will maintain the speed of body 78 sufficiently great to keep valves 122 closed and to thereby continue the direct drive.

If however, a constant speed prime mover is used to drive shaft 22, or the load on shaft 34 is so great that maximum increased power in the prime mover will not maintain the necessary speed of rotation in body 78 to hold valves 122 closed, then, as the speed of body 78 gradually and progressively decreases, valves 122, under the influence of springs 124, will slowly move toward the open position.

Automatically, and without operator effort or attention, the ratio between shafts 22 and 34 will commence changing as soon as valves 122 start to open and immediately, the direct drive will cease and the speed of rotation of shaft 22 will become greater than that of shaft 34.

As the load on shaft 34 continues to increase, with the prime mover operating at maximum or at a predetermined capacity, the valves 122 will open in proportion to the load increase and the differential in speeds of rotation between shafts 22 and 34, will gradually and progressively increase in the same proportion until such time as full indirect drive between shafts 22 and 34, through gears 68, 70, 74 and 76, takes place.

In many applications of the transmission hereof such as in the automotive field, it becomes necessary or desirable to still further reduce the ratio between shaft 22 and the load more than that made possible by the train of gears in compartment 38, to provide means for reverse rotation and/or to provide for a neutral. Accordingly, as illustrated in Fig. 1 of the drawing, there is provided an auxiliary transmission broadly designated by the numeral 128, which may be of conventional character except that no intermediate gear is necessary and has not been shown. Transmission 128 includes a suitable support 130 preferably integral with housing section 16. The driven shaft 34 has an extended section 134 that is rotatable relative thereto, the shaft 34 having a spur gear 136 secured thereto and the section 134 being carried by a bearing 138 in support 130. Spur gear 136 is constantly in mesh with a gear 140 freely rotatable on a shaft 142 and integrally joined with a gear 144 also freely rotatable on shaft 142. Gear 144 constantly meshes with a gear 146 rotatably carried by support 130. A pair of gears 148 and 150 are mounted for sliding movement on the shaft section 134 but are restrained from rotative movement with respect to section 134. Gear 150 may be moved to a position meshing with gear 146 to rotate shaft section 134 in the direction opposite to the direction of rotation of shaft 22 and shaft 34. When gear 148 is in mesh with gear 144, then shaft section 134 is rotated through gears 136, 140, 144 and 148 in the same direction as that of shaft 22 and shaft 34. When gear 148 is shifted out of its coupled relationship with gear 136 and while both gears 148 and 150 are out of mesh with gears 144 and 146 respectively, a neutral condition exists.

It is to be noted at this point that the transmission 128 is fully operable to rotate section 134 in either direction whether or not shaft 22 is in direct driving relationship to the shaft 34. Accordingly, the variable speed assembly above described and including case 24 with its component parts, will come into operation to provide infinitely variable speed ratio change even during use of gears 148 or 150 with gears 144 and 146 respectively.

In the automotive field particularly, engine braking is an important factor especially on forward, downhill movement. Except for a small amount of hold-back afforded by the primary, variable transmission hereof in high gear, the safety factor normally presented by aid to the automobile brakes through the engine is not herein presented. This is caused by the fact that whenever shaft 34 becomes the driving member by virtue of continued forward movement during decreased power in the prime mover for shaft 22, shaft 34 will transmit rotative movement to case 24 rather than effect the prime mover through the gearing in compartment 38. Thus, through use of gear 148, mountain travel can be rendered safer.

Oftentimes it may be necessary or desirable to provide in a transmission as above set forth, means to control the ratio changes that normally take place automatically and accordingly, one control means has been illustrated in Figs. 6 to 10 inclusive.

An annulus 152 is provided between the case section 28 and the housing section 16 mounted for reciprocable movement in a path of travel parallel with the axes of rotation of shafts 22 and 34, but restrained against rotative movement with respect to housing 12 and case 24. Movement of the annulus 152 in one direction toward the outermost end of shaft section 134 is caused by movement of a pair of diametrically opposed cams 154 interconnected by a semi-circular yoke 156 and rotatably mounted in housing section 16 by means of pins 158.

A crank arm 160 on one of the pins 158 and exteriorly of the housing 12, swings through an arcuate path of travel as illustrated in Fig. 7, through pivotal connection with the reciprocable plunger of a solenoid or other prime mover 162. The electro-magnetic device 162 may be energized through any suitable electric circuit such as that of an automobile truck or the like, and in this connection, a pair of normally open switch contacts 164 may be disposed within the path of travel of an accelerator pedal 166. As illustrated therefore, when pedal 166 is fully depressed to close contacts 164, the solenoid 162 is energized and cams 154 are rotated to move the annulus 152.

A cup-shaped member 168 within the case section 28, circumscribes the shaft section 132 and is mounted for reciprocable movement toward and away from the wall 106 of body section 82. A plurality of arms 170 pass through body section 28 and terminate within compartment 40 in rocking connection with the cup-shaped member 168 and each arm 170 has a roller 172 thereon bearing against that face of annulus 152 opposite to cams 154.

The fluid outlet passageways 114 (see Fig. 4) are continued as at 174 to place the same in communication directly with the chamber 104. Each outlet passage 114 respectively, is provided with a spring-loaded, normally closed valve 176 that extends across chamber 104 through wall 106 and terminates in a roller 178 bearing against the innermost face of member 168. That part of the stem for valves 176 that passes through wall 106 is polygonal in cross-section as shown in Fig. 10 to hold the same against rotation. Accordingly, whenever it is desired or becomes necessary to reduce the ratio between shafts 22 and 34, whether the same are in direct drive or operating under any condition that includes rotation of case 24, closing of contacts 164 will cause movement of annulus 152 against rollers 172 and thereby produce swinging movement of arm 170 in a direction to shift the member 168 toward wall 106. This in turn reciprocates spring-loaded valves 176 opening the extended passageways 174 and bleeding-off fluid emanating from housing 86 into the chamber 104.

In other words, the resistance to flow of fluid into chamber 104 is reduced and the pumps 88 are permitted to operate more freely with the result that an increased ratio is immediately produced between the shaft 22 and the shaft 34. This feature may serve as a valuable safety factor particularly in the automotive field whenever it is desired for instance to remove the direct drive and change the ratio during passing. It also provides for quick starts from standstill positions, an advantage to driving in congested traffic. The same feature may well be used to an advantage in commercial installations and manifestly, the particular way in which the fluid is bled-off, may be varied considerably over that illustrated in Figs. 6 to 10 inclusive, the latter being for illustrative purposes only.

It can now be appreciated that there has been provided a transmission that includes means for changing the ratio between the drive shaft and the driven shaft from any selected ratio to a direct drive all automatically as initially set forth herein. The selected ratio can be changed as desired by merely modifying the construction of the train of gears within compartment 38. Manifestly, the use to be made of the transmission will determine the gear ratio in compartment 38 and as the same is selectively varied, no effect upon the over-all basic principles of operation of the transmission hereof will take place.

Another important factor that becomes apparent from the foregoing is that while fluid means has been illustrated and described to interconnect the body 78 on shaft 34 with the shaft 22 and ultimately to directly lock the same with shaft 22 to obtain a direct drive, various and sundry other means may be substituted for the fluid operation. It is obvious without illustration, that such interlocking may comprise purely mechanical parts and it is further clear that even if a fluid is utilized, pumps other than the gear-type, chosen for illustration of the basic principles hereof only may be substituted, all within the broad principles herein taught. In this connection, cam operated piston pumps in a closed hydraulic system with the same or similar valve features as above set forth, or any one of several other systems, could be used to present a completely non-slipping direct drive.

Notable also is the fact that friction producing apparatus or means has not been included in the system and that in direct drive friction is confined to the ball bearings at the outer supports for case 24.

Another factor that must be emphasized and as above indicated, is that the transmission hereof is not limited to any particular field. Its use is fully adaptable to mobile vehicles of all kinds including passenger cars, trucks, tractors and the like. In the purely commercial field, the transmission may be interposed between any prime mover and any apparatus or device that is to be motivated by the driven shaft 34. In any event, since during the initial starting, the ratio between shaft 22 and shaft 34 is greatly reduced within the compartment 38, undue load is not placed upon a prime mover during the initial starting of rotation of shaft 34 when the same has a load thereon. Thus, relatively inexpensive engines, electric motor, or prime movers may be utilized since the same will be fully capable of handling a relatively large load after the variable speed mechanism hereof commences operating. The elimination in the field of electric motors of separate starters as is now common, will well compensate for the expense of manufacture of the transmission hereof and such motor will not be unduly taxed during operations that include many stops and starts.

Finally, the importance of brake 54 to the operation of the apparatus should not be overlooked, and while means other than a one-way brake may be used, some means such as ratchet-pawl mechanism must be provided to limit rotation of case 24 opposite to that of shaft 22.

The four principal factors of the present power transmitting device hereof as initially set forth herein can now be appreciated by those skilled in this art. Automatic ratio change without power interruption, infinitely variable speed ratio, elimination of slippage and provision of a constant mesh are all individually desirable. So far as I am aware, they have never heretofore been combined in a single power transmission. And, the importance of the practical application thereof to the industrial, non-automotive field, to provide attention-free operation, cannot be discounted.

Accordingly, such other advantages and uses that may emanate from or be made of the power transmitting device hereof which fairly come within the spirit of this invention, are contemplated hereby.

Having thus described the invention, what is claimed as new and desired to be secured by Letters Patent is:

1. In a power transmission having a hollow housing, a driven shaft extending into the housing and rotatably carried thereby, a hollow case rotatably mounted on the driven shaft within the housing, a drive shaft extending into the case and rotatably carried thereby, means interposed between the housing and the case for restraining the latter from rotation in one direction, and a train of differential gearing in the case including a sun gear on the drive shaft and on the driven shaft respectively and a plurality of planet gears for each sun gear respectively and rotatably carried by the case, the planet gears for one sun gear each being rigidly joined to a corresponding planet gear of the other sun gear, the improvement of which comprises a hollow body rigidly secured to the driven shaft for rotation therewith within said case; and means carried by the body for rotation therewith and operably connected to said case for varying the speed of rotation of the case in the opposite direction relative to the body in response to the speed of rotation of the latter, whereby to establish an automatically and infinitely variable connection between the shafts responsive solely and directly to the speed of rotation of the driven shaft.

2. In a power transmission having a hollow housing, a driven shaft extending into the housing and rotatably carried thereby, a hollow case adapted to contain fluid and rotatably mounted on the driven shaft within the housing, a drive shaft extending into the case and rotatably carried thereby, means interposed between the housing and the case for restraining the latter from rotation in one direction, and a train of differential gearing in the case including a sun gear on the drive shaft and on the driven shaft respectively and a plurality of planet gears for each sun gear respectively and rotatably carried by the case, the planet gears for one sun gear each being rigidly joined to a corresponding planet gear of the other sun gear, the improvement of which comprises a hollow body rigidly secured to the driven shaft for rotation therewith within said case; pump means carried by the body for rotation therewith; mechanism connecting the case with said pump means for operating the latter when the case and the body rotate relatively; and means mounted on the body for controlling the flow of the fluid of the case to and from said pump means in response to the speed of rotation of said body, whereby to establish an automatically and infinitely variable connection between the shafts responsive solely and directly to the speed of rotation of the driven shaft.

3. In a power transmission having a hollow housing, a driven shaft extending into the housing and rotatably carried thereby, a hollow case adapted to contain fluid and rotatably mounted on the driven shaft within the housing, a drive shaft extending into the case and rotatably carried thereby, means interposed between the housing and the case for restraining the latter from rotation in one direction, and a train of differential gearing in the case including a sun gear on the drive shaft and on the driven shaft respectively and a plurality of planet gears for each sun gear respectively and rotatably carried by the case, the planet gears for one sun gear each being rigidly joined to a corresponding planet gear of the other sun gear, the improvement of which comprises a hollow body rigidly secured to the driven shaft for rotation therewith within said case; pump means carried by the body for rotation therewith; a drive gear rotatably carried by the body for rotation therewith and operably coupled with the pump means; a ring gear rigid to the case for rotation therewith and in mesh with the drive gear for operating the pump means when the case and the body rotate relatively; and means mounted on the body for controlling the flow of the fluid of the case to and from said pump means in response to the speed of rotation of said body, whereby to establish an automatically and infinitely variable connection between the shafts responsive solely and directly to the speed of rotation of the driven shaft.

4. In a power transmission having a hollow housing, a driven shaft extending into the housing and rotatably carried thereby, a hollow case adapted to contain fluid and rotatably mounted on the driven shaft within the housing, a drive shaft extending into the case and rotatably carried thereby, means interposed between the housing and the case for restraining the latter from rotation in one direction, and a train of differential gearing in the case including a sun gear on the drive shaft and on the driven shaft respectively and a plurality of planet gears for each sun gear respectively and rotatably carried by the case, the planet gears for one sun gear each being rigidly joined to a corresponding planet gear of the other sun gear, the improvement of which comprises a hollow body rigidly secured to the driven shaft for rotation therewith within said case; pump means including a pair of intermeshing pump gears rotatably carried by the body for rotation therewith; a drive gear rotatably carried by the body for rotation therewith and operably coupled with one of the pump gears; a ring gear rigid to the case for rotation therewith and in mesh with the drive gear for operating the pump means when the case and the body rotate relatively; and means mounted on the body for controlling the flow of the fluid of the case to and from said pump means in response to the speed of rotation of said body, whereby to establish an automatically and infinitely variable connection between the shafts responsive solely and directly to the speed of rotation of the driven shaft.

5. In a power transmission having a hollow housing, a driven shaft extending into the housing and rotatably carried thereby, a hollow case adapted to contain fluid and rotatably mounted on the driven shaft within the housing, a drive shaft extending into the case and rotatably carried thereby, means interposed between the housing and the case for restraining the latter from rotation in one direction, and a train of differential gearing in the case including a sun gear on the drive shaft and on the driven shaft respectively and a plurality of planet gears for each sun gear respectively and rotatably carried by the case, the planet gears for one sun gear each being rigidly joined to a corresponding planet gear of the other sun gear, the improvement of which comprises a hollow body rigidly secured to the driven shaft for rotation therewith within said case, said body having a fluid passage communicating with said case; pump means in said passage and carried by the body for rotation therewith; mechanism connecting the case with said pump means for operating the latter when the case and the body rotate relatively; and a centrifugal valve mounted on the body within the passage and disposed to progressively close the latter in response to increased speeds of rotation of the body for controlling the flow of the fluid of the case to and from said pump means in response to the speed of rotation of said body, whereby to establish an automatically and infinitely variable connection between the shafts responsive solely and directly to the speed of rotation of the driven shaft.

6. In the invention as set forth in claim 5, wherein said body is provided with a second passage disposed to direct fluid from the pump means to the case; a normally closed closure in the second passage; actuating means for the closure; and mechanism operably interconnecting the actuating means and said closure.

THEODORE F. KUHN.

References Cited in the file of this patent

UNITED STATES PATENTS

| Number | Name | Date |
|---|---|---|
| 1,755,182 | Kline | Apr. 22, 1930 |
| 1,919,876 | Ballentin | July 25, 1933 |
| 2,045,777 | Hull | June 30, 1936 |
| 2,079,691 | Joyce | May 11, 1937 |
| 2,153,796 | Fletcher | Apr. 11, 1939 |
| 2,211,234 | Kosian | Aug. 13, 1940 |
| 2,276,908 | Schmid | Mar. 17, 1942 |
| 2,293,547 | Hobbs | Aug. 18, 1942 |
| 2,308,082 | Johnson | Jan. 12, 1943 |
| 2,330,374 | Orner | Sept. 28, 1943 |
| 2,330,375 | Orner | Sept. 28, 1943 |